United States Patent
Choi et al.

(10) Patent No.: US 12,154,227 B2
(45) Date of Patent: Nov. 26, 2024

(54) THREE DIMENSIONAL RENDERING SYSTEMS AND METHODS FROM MONOCULAR IMAGE

(71) Applicants: NAVER CORPORATION, Gyeonggi-do (KR); SEOUL NATIONAL UNIVERSITY R&DB FOUNDATION, Seoul (KR)

(72) Inventors: Hongsuk Choi, New York, NY (US); Gyeongsik Moon, Pittsburgh, PA (US); Vincent Leroy, Laval (FR); KyoungMu Lee, Seoul (KR); Grégory Rogez, Gières (FR)

(73) Assignees: NAVER CORPORATION, Gyeonggi-Do (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 60 days.

(21) Appl. No.: 18/082,780

(22) Filed: Dec. 16, 2022

(65) Prior Publication Data

US 2024/0046569 A1 Feb. 8, 2024

Related U.S. Application Data

(60) Provisional application No. 63/394,741, filed on Aug. 3, 2022.

(51) Int. Cl.
*G06T 17/20* (2006.01)
*G06T 15/04* (2011.01)
(Continued)

(52) U.S. Cl.
CPC .............. *G06T 17/20* (2013.01); *G06T 15/04* (2013.01); *G06T 15/08* (2013.01); *G06T 19/20* (2013.01); *G06T 2219/2012* (2013.01)

(58) Field of Classification Search
CPC ......... G06T 15/08; G06T 19/20; G06T 17/20; G06T 17/00; G06T 2219/2012; G06T 15/04; G06T 15/20
See application file for complete search history.

(56) References Cited

U.S. PATENT DOCUMENTS

| | | | |
|---|---|---|---|
| 2012/0128218 A1* | 5/2012 | Amyot | G06T 19/00 382/128 |
| 2021/0295570 A1* | 9/2021 | Broyelle | G06V 10/82 |

(Continued)

OTHER PUBLICATIONS

Adam Paszke, Sam Gross, Soumith Chintala, Gregory Chanan, Edward Yang, Zachary DeVito, Zeming Lin, Alban Desmaison, Luca Antiga, and Adam Lerer. Automatic differentiation in pytorch. 2017.

(Continued)

*Primary Examiner* — Phi Hoang (57) ABSTRACT

A system includes: a feature module configured to generate a feature map based on a single image taken from a point of view (POV) including a human based on features of the human visible in the image and non-visible features of the human; a pixel features module configured to generate pixel features based on the feature map and a target POV; a feature mesh module configured to generate a feature mesh for the human based on the feature map; a geometry module configured to: generate voxel features based on the feature mesh; and generate a density value based on the voxel and pixel features; a texture module configured to generate RGB colors for pixels based on the density value and the pixel features; and a rendering module configured to generate a three dimensional rendering of the human from the target POV based on the RGB colors and the density value.

40 Claims, 7 Drawing Sheets
(3 of 7 Drawing Sheet(s) Filed in Color)

(51) Int. Cl.
    *G06T 15/08* (2011.01)
    *G06T 19/20* (2011.01)

(56) References Cited

U.S. PATENT DOCUMENTS

| | | | | |
|---|---|---|---|---|
| 2023/0046926 | A1* | 2/2023 | Saxena | G06T 17/05 |
| 2023/0070008 | A1* | 3/2023 | Kulon | G06T 3/40 |
| 2023/0089330 | A1* | 3/2023 | Cella | G02B 26/00 |
| 2023/0168735 | A1* | 6/2023 | Chugh | G06V 40/168 |
| | | | | 382/103 |
| 2023/0222750 | A1* | 7/2023 | Querbes | G06T 7/70 |
| | | | | 345/420 |
| 2023/0306686 | A1* | 9/2023 | Zangenehpour | G06T 7/11 |

OTHER PUBLICATIONS

Alex Yu, Vickie Ye, Matthew Tancik, and Angjoo Kanazawa. pixelnerf: Neural radiance fields from one or few images. In CVPR, 2021.

Alvaro Collet, Ming Chuang, Pat Sweeney, Don Gillett, Dennis Evseev, David Calabrese, Hugues Hoppe, Adam G. Kirk, and Steve Sullivan. High-quality streamable free-viewpoint video. ACM TOG, 2015.

Amit Raj, Michael Zollhofer, Tomas Simon, Jason Saragih, Shunsuke Saito, James Hays, and Stephen Lombardi. Pixelaligned volumetric avatars. In CVPR, 2021.

Atsuhiro Noguchi, Xiao Sun, Stephen Lin, and Tatsuya Harada. Neural articulated radiance field. In ICCV, 2021.

Ben Mildenhall, Pratul P Srinivasan, Matthew Tancik, Jonathan T Barron, Ravi Ramamoorthi, and Ren Ng. Nerf: Representing scenes as neural radiance fields for view synthesis. In ECCV, 2020.

Benjamin Graham, Martin Engelcke, and Laurens van der Maaten. 3d semantic segmentation with submanifold sparse convolutional networks. In CVPR, 2018.

Chenglei Wu, Carsten Stoll, Levi Valgaerts, and Christian Theobalt. On-set performance capture of multiple actors with a stereo camera. ACM TOG, 2013.

Christian Theobalt, Edilson de Aguiar, Carsten Stoll, Hans-Peter Seidel, and Sebastian Thrun. Performance capture from multi-view video. In Remi Ronfard and Gabriel Taubin, editors, Image and Geometry Processing for 3-D Cinematography. 2010.

De Rosal Igantius Moses Setiadi. Psnr vs ssim: imperceptibility quality assessment for image steganography. MTA, 2021.

Diederik P Kingma and Jimmy Ba. Adam: A method for stochastic optimization. In ICLR, 2014.

Gyeongsik Moon, Hongsuk Choi, and Kyoung Mu Lee. Accurate 3D hand pose estimation for whole-body 3D human mesh estimation. In CVPRW, 2022.

James T Kajiya and Brian P Von Herzen. Ray tracing volume densities. In Siggraph, 1984.

Jean-Sebastien Franco and Edmond Boyer. Efficient polyhedral modeling from silhouettes. TPAMI, 2009.

Jianchuan Chen, Ying Zhang, Di Kang, Xuefei Zhe, Linchao Bao, and Huchuan Lu. Animatable neural radiance fields from monocular rgb video. arXiv preprint arXiv:2106.13629, 2021.

Johannes L Schonberger, Enliang Zheng, Jan-Michael Frahm, and Marc Pollefeys. Pixelwise view selection for unstructured multi-view stereo. In ECCV, 2016.

Johannes L Schonberger and Jan-Michael Frahm. Structure from-motion revisited. In CVPR, 2016.

Jonathan Starck and Adrian Hilton. Surface capture for performance-based animation. IEEE Computer Graphics and Applications, 2007.

Julian Chibane, Aayush Bansal, Verica Lazova, and Gerard Pons-Moll. Stereo radiance fields (srf): Learning view synthesis for sparse views of novel scenes. In CVPR, 2021.

Kaiming He, Xiangyu Zhang, Shaoqing Ren, and Jian Sun. Deep residual learning for image recognition. In CVPR, 2016.

Kaiwen Guo, Peter Lincoln, Philip L. Davidson, Jay Busch, Xueming Yu, Matt Whalen, Geoff Harvey, Sergio Orts-Escolano, Rohit Pandey, Jason Dourgarian, Danhang Tang, Anastasia Tkach, Adarsh Kowdle, Emily Cooper, Mingsong Dou, Sean Ryan Fanello, Graham Fyffe, Christoph Rhemann, Jonathan Taylor, Paul E. Debevec, and Shahram Izadi. The relightables: volumetric performance capture of humans with realistic relighting. ACM TOG, 2019.

Ke Gong, Xiaodan Liang, Yicheng Li, Yimin Chen, Ming Yang, and Liang Lin. Instance-level human parsing via part grouping network. In ECCV, 2018.

Lan Xu, Weipeng Xu, Vladislav Golyanik, Marc Habermann, Lu Fang, and Christian Theobalt. Eventcap: Monocular 3d capture of high-speed human motions using an event camera. In CVPR, 2020.

Lingjie Liu, Marc Habermann, Viktor Rudnev, Kripasindhu Sarkar, Jiatao Gu, and Christian Theobalt. Neural actor: Neural free-view synthesis of human actors with pose control. ACM TOG Asia, 2021.

Marc Habermann, Weipeng Xu, Michael Zollhofer, Gerard Pons-Moll, and Christian Theobalt. Livecap: Real-time human performance capture from monocular video. ACM TOG, 2019.

Matthew Loper, Naureen Mahmood, Javier Romero, Gerard Pons-Moll, and Michael J Black. Smpl: A skinned multiperson linear model. ACM TOG, 2015.

Matthieu Armando, Jean-Sebastien Franco, and Edmond Boyer. Adaptive mesh texture for multi-view appearance modeling. In 3DV, 2019.

Minye Wu, Yuehao Wang, Qiang Hu, and Jingyi Yu. Multiview neural human rendering. In CVPR, 2020.

Moon, G., Lee, K.M.: Pose2Pose: 3D positional pose-guided 3D rotational pose prediction for expressive 3d human pose and mesh estimation. arXiv preprint arXiv:2011.11534 (2020).

Nelson Max. Optical models for direct vol. rendering. TVCG, 1995.

Nikos Kolotouros, Georgios Pavlakos, Michael J Black, and Kostas Daniilidis. Learning to reconstruct 3D human pose and shape via model-fitting in the loop. In ICCV, 2019.

Paul E. Debevec, Tim Hawkins, Chris Tchou, Haarm-Pieter Duiker, Westley Sarokin, and Mark Sagar. Acquiring the reflectance field of a human face. In Siggraph, 2000.

Pierre Zins, Yuanlu Xu, Edmond Boyer, Stefanie Wuhrer, and Tony Tung. Learning implicit 3d representations of dressed humans from sparse views. In 3DV, 2021.

Qianli Ma, Jinlong Yang, Anurag Ranjan, Sergi Pujades, Gerard Pons-Moll, Siyu Tang, and Michael J Black. Learning to dress 3d people in generative clothing. In CVPR, 2020.

Qianqian Wang, Zhicheng Wang, Kyle Genova, Pratul P Srinivasan, Howard Zhou, Jonathan T Barron, Ricardo Martin-Brualla, Noah Snavely, and Thomas Funkhouser. Ibrnet: Learning multi-view image-based rendering. In CVPR, 2021.

Ruilong Li, Shan Yang, David A Ross, and Angjoo Kanazawa. Learn to dance with aist++: Music conditioned 3d dance generation. In ICCV, 2021.

Ruizhi Shao, Hongwen Zhang, He Zhang, Yanpei Cao, Tao Yu, and Yebin Liu. Doublefield: Bridging the neural surface and radiance fields for high-fidelity human rendering. arXiv preprint arXiv:2106.03798, 2021.

Shihong Xia, Lin Gao, Yu-Kun Lai, Mingzhe Yuan, and Jinxiang Chai. A survey on human performance capture and animation. J. Comput. Sci. Technol., 2017.

Shih-Yang Su, Frank Yu, Michael Zollhofer, and Helge Rhodin. A-nerf: Articulated neural radiance fields for learning human shape, appearance, and pose. In Advances in Neural Information Processing Systems, 2021.

Shugao Ma, Tomas Simon, Jason M. Saragih, Dawei Wang, Yuecheng Li, Fernando De la Torre, and Yaser Sheikh. Pixel codec avatars. In CVPR, 2021.

Shuhei Tsuchida, Satoru Fukayama, Masahiro Hamasaki, and Masataka Goto. Aist dance video database: Multi-genre, multi-dancer, and multi-camera database for dance information processing. In ISMIR, 2019.

Shunsuke Saito, Jinlong Yang, Qianli Ma, and Michael J Black. Scanimate: Weakly supervised learning of skinned clothed avatar networks. In CVPR, 2021.

Shunsuke Saito, Tomas Simon, Jason Saragih, and Hanbyul Joo. Pifuhd: Multi-level pixel-aligned implicit function for high-resolution 3d human digitization. In CVPR, 2020.

(56) References Cited

OTHER PUBLICATIONS

Shunsuke Saito, Zeng Huang, Ryota Natsume, Shigeo Morishima, Angjoo Kanazawa, and Hao Li. Pifu: Pixel-aligned implicit function for high-resolution clothed human digitization. In ICCV, 2019.

Sida Peng, Junting Dong, Qianqian Wang, Shangzhan Zhang, Qing Shuai, Hujun Bao, and Xiaowei Zhou. Animatable neural radiance fields for human body modeling. In ICCV, 2021.

Sida Peng, Yuanqing Zhang, Yinghao Xu, Qianqian Wang, Qing Shuai, Hujun Bao, and Xiaowei Zhou. Neural body: Implicit neural representations with structured latent codes for novel view synthesis of dynamic humans. In CVPR, 2021.

Tong He, Yuanlu Xu, Shunsuke Saito, Stefano Soatto, and Tony Tung. Arch++: Animation-ready clothed human reconstruction revisited. ArXiv, abs/2108.07845, 2021.

Vincent Leroy, Jean-S'ebastien Franco, and Edmond Boyer. Shape reconstruction using vol. sweeping and learned photoconsistency. In ECCV, 2018.

Vincent Leroy, Jean-Sebastien Franco, and Edmond Boyer. Volume sweeping: Learning photoconsistency for multiview shape reconstruction. IJCV.

Weipeng Xu, Avishek Chatterjee, Michael Zollhofer, Helge Rhodin, Dushyant Mehta, Hans- Peter Seidel, and Christian Theobalt. Monoperfcap: Human performance capture from monocular video. ACM TOG, 2018.

Xiangyu Xu and Chen Change Loy. 3D human texture estimation from a single image with transformers. In Proceedings of the IEEE International Conference on Computer Vision, 2021.

Yang Hong, Juyong Zhang, Boyi Jiang, Yudong Guo, Ligang Liu, and Hujun Bao. Stereopifu: Depth aware clothed human digitization via stereo vision. In CVPR, 2021.

Youngjoong Kwon, Dahun Kim, Duygu Ceylan, and Henry Fuchs. Neural human performer: Learning generalizable radiance fields for human performance rendering. In ICCV, 2021.

Zeng Huang, Tianye Li, Weikai Chen, Yajie Zhao, Jun Xing, Chloe LeGendre, Linjie Luo, Chongyang Ma, and Hao Li. Deep volumetric video from very sparse multi-view performance capture. In Vittorio Ferrari, Martial Hebert, Cristian Sminchisescu, and Yair Weiss, editors, ECCV, 2018.

Zeng Huang, Yuanlu Xu, Christoph Lassner, Hao Li, and Tony Tung. Arch: Animatable reconstruction of clothed humans. In Proceedings of the IEEE/CVF Conference on Computer Vision and Pattern Recognition (CVPR), Jun. 2020.

Zerong Zheng, Tao Yu, Yebin Liu, and Qionghai Dai. Pamir: Parametric model-conditioned implicit representation for image-based human reconstruction. TPAMI, 2021.

Zhe Li, Tao Yu, Zerong Zheng, Kaiwen Guo, and Yebin Liu. Posefusion: Pose-guided selective fusion for single-view human volumetric capture. In CVPR, 2021.

Zhixuan Yu, Jae Shin Yoon, In Kyu Lee, Prashanth Venkatesh, Jaesik Park, Jihun Yu, and Hyun Soo Park. Humbi: A large multiview dataset of human body expressions. In CVPR, 2020.

Zhixuan Yu, Jae Shin Yoon, Prashanth Venkatesh, Jaesik Park, Jihun Yu, and Hyun Soo Park. HUMBI 1.0: Human multiview behavioral imaging dataset. CoRR, abs/1812.00281, 2018.

Ziyan Wang, Timur Bagautdinov, Stephen Lombardi, Tomas Simon, Jason Saragih, Jessica Hodgins, and Michael Zollhofer. Learning compositional radiance fields of dynamic human heads. In CVPR, 2021.

* cited by examiner

THREE DIMENSIONAL RENDERING SYSTEMS AND METHODS FROM MONOCULAR IMAGE

CROSS-REFERENCE TO RELATED APPLICATIONS

This application claims the benefit of U.S. Provisional Application No. 63/394,741, filed on Aug. 3, 2022. The entire disclosure of the application referenced above is incorporated herein by reference.

FIELD

The present disclosure relates to an image processing rendering system and more particularly to systems and methods for three dimensional human rendering from monocular images.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Images (digital images) from cameras are used in many different ways. For example, objects can be identified in images, and a navigating vehicle can travel while avoiding the objects. Images can be matched with other images, for example, to identify a human captured within an image. There are many more other possible uses for images taken using cameras.

A mobile device may include one or more cameras. For example, a mobile device may include a camera with a field of view covering an area where a user would be present when viewing a display (e.g., a touchscreen display) of the mobile device. This camera may be referred to as a front facing (or front) camera. The front facing camera may be used to capture images in the same direction as the display is displaying information. A mobile device may also include a camera with a field of view facing the opposite direction as the camera referenced above. This camera may be referred to as a rear facing (or rear) camera. Some mobile devices include multiple front facing cameras and/or multiple rear facing cameras.

SUMMARY

In a feature, a human rendering system includes: a feature module configured to generate a feature map based on a single image taken from a point of view (POV) including a human based on features of the human visible in the image and non-visible features of the human; a pixel features module configured to generate pixel features based on the feature map and a target POV that is different than the POV of the image; a feature mesh module configured to generate a feature mesh for the human based on the feature map; a geometry module configured to: generate voxel features based on the feature mesh for the human; and generate a density value based on the voxel features and the pixel features; a texture module configured to generate RGB colors for pixels based on the density value and the pixel features; and a rendering module configured to generate a three dimensional (3D) rendering of the human in the image from the target POV based on the RGB colors and the density value.

In further features, the rendering module is configured to generate the 3D rendering of the human using a volume rendering algorithm.

In further features, the feature module includes the ResNet-18 convolutional neural network.

In further features, the texture module is configured to generate the RGB colors for the pixels further based on a distance to a root joint of the human.

In further features, the root joint is a pelvis of the human.

In further features, the texture module is configured to generate the RGB colors for the pixels further based on the target POV.

In further features, the geometry module is configured to generate the density value further based on a distance to a root joint of the human.

In further features, the texture module is configured to generate the RGB colors for the pixels using a multilayer perceptron (MLP) network.

In further features, the geometry module is configured to generate the density value using a multilayer perceptron (MLP) network.

In further features, the MLP network includes N layers where N is an integer greater than 2 and is configured to output the density value from a second to last one of the N layers of the MLP network.

In further features, an inpainter module is configured to determine colors for vertices, respectively, of the feature mesh.

In further features, the inpainter module determine the colors for the vertices, respectively, and generates the density value using a multilayer perceptron (MLP) network.

In further features, a training module is configured to selectively adjust one or more parameters of the feature mesh module based on minimizing differences between (a) the colors for the vertices of the feature mesh and (b) ground truth colors for the vertices of the feature mesh.

In further features, a training module is configured to selectively adjust one or more parameters of the texture module based on minimizing differences between (a) the RGB colors for the pixels and (b) ground truth RGB colors for the pixels.

In further features, the rendering module is configured to generate the 3D rendering of the human in the image from the target POV based on the RGB colors and the density value without the human rendering system receiving any other images including the human.

In further features, a training module is configured to train the rendering module using two loss functions (a) an inpainting loss and (b) a rendering loss.

In further features, the feature mesh module is configured to generate the feature mesh for the human further based on a pre-estimated mesh.

In a feature, a body rendering system includes: a feature module configured to generate a feature map based on a single image taken from a point of view (POV) including a body based on features of the body visible in the image and non-visible features of the body in the image; a pixel features module configured to generate pixel features based on the feature map and a target POV that is different than the POV of the image; a feature mesh module configured to generate a feature mesh for the body based on the feature map; a geometry module configured to: generate voxel features based on the feature mesh for the body; and generate a density value based on the voxel features and the pixel features; a texture module configured to generate pixel values for pixels based on the density value and the pixel features; and a rendering module configured to generate a three dimensional (3D) rendering of the body in the image from the target POV based on the pixel values and the density value.

In further features, the body visible in the image is a human body.

In further features, the pixel values correspond to one of RGB color values and grayscale values.

In a feature, a human rendering method includes: generating a feature map based on a single image taken from a point of view (POV) including a human based on features of the human visible in the image and non-visible features of the human; generating pixel features based on the feature map and a target POV that is different than the POV of the image; generating a feature mesh for the human based on the feature map; generating voxel features based on the feature mesh for the human; and generating a density value based on the voxel features and the pixel features; generating RGB colors for pixels based on the density value and the pixel features; and generating a three dimensional (3D) rendering of the human in the image from the target POV based on the RGB colors and the density value.

In further features, generating the 3D rendering includes generating the 3D rendering of the human using a volume rendering algorithm.

In further features, generating the feature map includes generating the feature map using the ResNet-18 convolutional neural network.

In further features, generating the RGB colors includes generating the RGB colors for the pixels further based on a distance to a root joint of the human.

In further features, the root joint is a pelvis of the human.

In further features, generating the RGB colors includes generating the RGB colors for the pixels further based on the target POV.

In further features, generating the density value includes generating the density value further based on a distance to a root joint of the human.

In further features, generating the RGB colors includes generating the RGB colors for the pixels using a multilayer perceptron (MLP) network.

In further features, generating the density value includes generating the density value using a multilayer perceptron (MLP) network.

In further features, the MLP network includes N layers where N is an integer greater than 2 and is configured to output the density value from a second to last one of the N layers of the MLP network.

In further features, the human rendering method further includes determining colors for vertices, respectively, of the feature mesh.

In further features, determining the colors includes determining the colors for the vertices, respectively, and the human rendering method further includes generating the density value using a multilayer perceptron (MLP) network.

In further features, the human rendering method further includes selectively adjusting one or more parameters based on minimizing differences between (a) the colors for the vertices of the feature mesh and (b) ground truth colors for the vertices of the feature mesh.

In further features, the human rendering method further includes selectively adjusting one or more parameters based on minimizing differences between (a) the RGB colors for the pixels and (b) ground truth RGB colors for the pixels.

In further features, generating the 3D rendering includes generating the 3D rendering of the human in the image from the target POV based on the RGB colors and the density value independently of any other images including the human.

In further features, the human rendering method further includes training for the 3D rendering of the human using two loss functions (a) an inpainting loss and (b) a rendering loss.

In further features, generating the feature mesh includes generating the feature mesh for the human further based on a pre-estimated mesh.

In a feature, a body rendering method includes: generating a feature map based on a single image taken from a point of view (POV) including a body based on features of the body visible in the image and non-visible features of the body in the image; generating pixel features based on the feature map and a target POV that is different than the POV of the image; generating a feature mesh for the body based on the feature map; generating voxel features based on the feature mesh for the body; generating a density value based on the voxel features and the pixel features; generating pixel values for pixels based on the density value and the pixel features; and generating a three dimensional (3D) rendering of the body in the image from the target POV based on the pixel values and the density value.

In further features, the body visible in the image is a human body.

In further features, the pixel values correspond to one of RGB color values and grayscale values.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The present disclosure will become more fully understood from the detailed description and the accompanying drawings, wherein.

DETAILED DESCRIPTION

Capturing the full appearance and three dimensional (3D) shape of a human from a single monocular image is a complex problem with many potential applications, such as in augmented reality (AR), virtual reality (VR), social networking, virtual clothing try on, etc.

The present application involves human rendering systems and methods for generating a 3D whole body rendering of a human captured in a (one) monocular image without the need for multiple images of the human from multiple different points of view. A neural network is used. The neural network disentangles 3D geometry and texture features and conditions a texture inference on 3D geometry features. An inpainter module inpaints occluded body parts vertices. The disentanglement and use of the inpainter provide improved 3D renderings of humans generated based on monocular images, respectively.

The neural network includes a feature module that produces a feature map F from an input monocular image I. Pixel features P and mesh features M are extracted from the feature map. The inpainter module determines colors for the vertices of the mesh feature. A geometry module is included, which processes the mesh features in 3D, determines voxel features v. In various implementations, the geometry module includes a sparse 3D convolution. Based on the voxel features, the pixel features, and a root joint relative depth relative to the input camera, the geometry module determines a density value. A texture module determines a red green blue (RGB) value from the pixel features, the root joint relative depth, the POV, and the density value. A rendering module generates the 3D rendering from the point of view using a volume rendering algorithm based on the density and RGB values.

Figure 1:
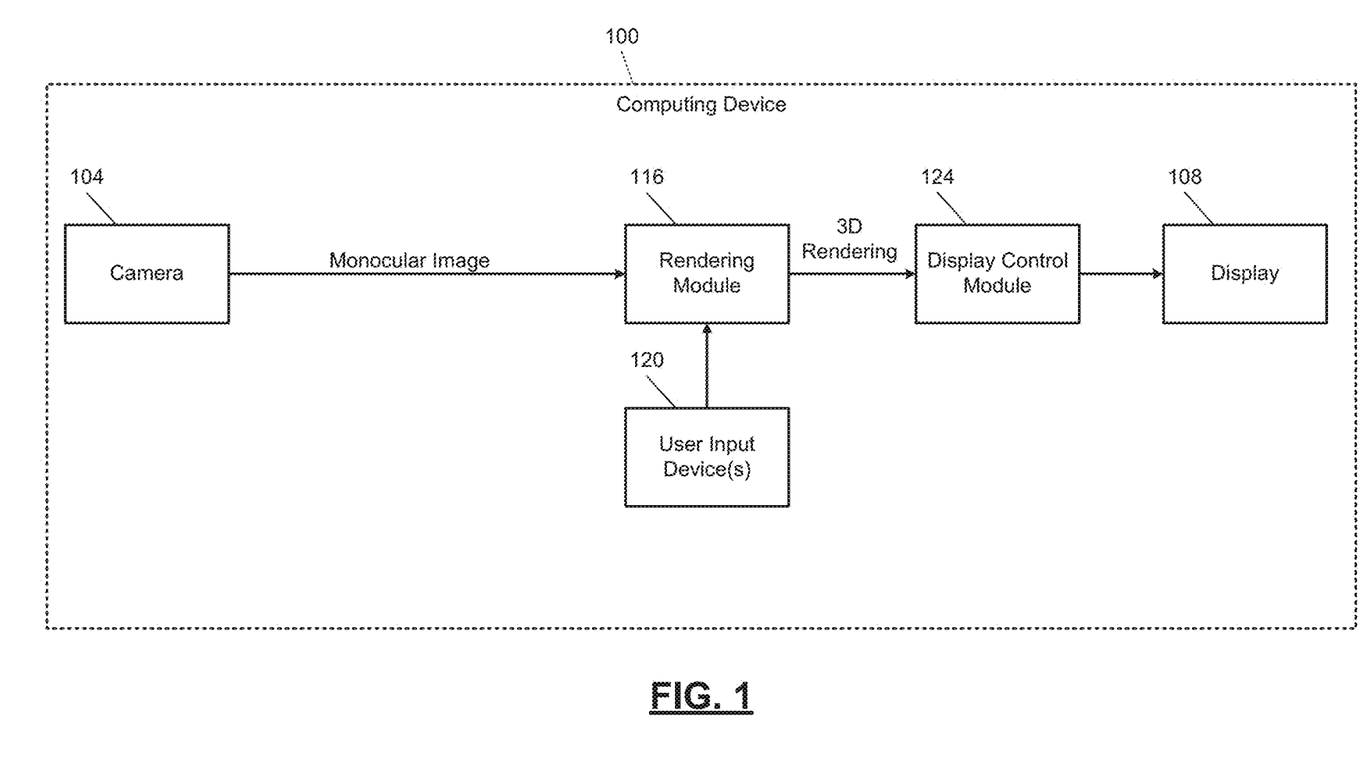
FIG. 1 is a functional block diagram of an example computing device.

FIG. 1 is a functional block diagram of an example implementation of a computing device 100. The computing device 100 may be, for example, a smartphone, a tablet device, a laptop computer, a desktop computer, or another suitable type of computing device.

A camera 104 is configured to capture images. For some types of computing devices, the camera 104, a display 108, or both may not be included in the computing device 100. The camera 104 may be a front facing camera or a rear facing camera. While only one camera is shown, the computing device 100 may include multiple cameras, such as at least one rear facing camera and at least one forward facing camera.

A rendering module 116 generates a three dimensional (3D) rendering of a human captured in a monocular image. The image may be, for example, an image from the camera 104, an image stored in memory of the computing device 100, or an image received from another computing device, such as via a network (e.g., the Internet). The camera 104 may capture images at a predetermined rate (e.g., corresponding to 60 Hertz (Hz), 120 Hz, etc.), for example, to produce video. The rendering module 116 is discussed further below.

The monocular image including the human is taken from one point of view (POV). Using the 3D rendering of the human, the rendering module 116 generates an adjusted 3D rendering of the human from one or more different (target) POVs. A target POV for rendering the human may be set based user input from one or more user input devices 120. Examples of user input devices include but are not limited to keyboards, mouses, track balls, joysticks, and touchscreen displays. In various implementations, such as in augmented reality (AR) applications, the target POV may be provided by another camera, an inertia measurement unit (IMU), and/or an odometry system moving in another environment.

As an example, the rendering module 116 may initialize the adjusted 3D rendering of the human to the POV of the monocular image. The rendering module 116 may set the target POV to the right of the present target POV in response to a user swiping right to left on a touchscreen display, thereby rotating rendering of the human relative to the POV of the monocular image. The rendering module 116 may set the target POV to the left of the present target POV in response to a user swiping left toward right on a touchscreen display, thereby rotating rendering of the human relative to the present target POV. The rendering module 116 may set the target POV to the right of the present target POV in response to a user swiping right toward left on a touchscreen display, thereby rotating rendering of the human relative to the present target POV. The rendering module 116 may set the target POV to upwardly from the present target POV in response to a user swiping top toward bottom on a touchscreen display, thereby rotating rendering of the human relative to the present target POV. The rendering module 116 may set the target POV to downwardly from the present target POV in response to a user swiping bottom toward top on a touchscreen display, thereby rotating rendering of the human relative to the present target POV. The degree and direction of rotation performed by the rendering module 116 may be based on the direction and length of touching. In various implementations, movement of the target POV may be both vertical and horizontal based on user input.

A display control module 124 (e.g., including a display driver) displays the adjusted 3D rendering on the display 108. The display control module 124 may update what is displayed at the predetermined rate to display video on the display 108. In various implementations, the display 108 may be a touchscreen display or a non-touch screen display.

While the example of generating adjusted renderings is provided, the present application is also applicable to various uses of the renderings. For example, the renderings may be used to determine pose of the human, which may be tracked and used to train motion of a robot and actuation of a gripping element. For example, poses carry information on both the arm and the fingers, which may allow for fine-tuned gesture control of devices. Detecting both global postures and the hand poses can allow robots to be trained from humans, such as how to move within a scene, how to grasp objects, etc. Posture of the human may also be determined, such as to determine an action being performed by the human.

Detecting facial pose may enable determination of the direction in which a human is looking, who is talking in a scene, sentiment recognition, etc. There are numerous other uses of the adjusted renderings. For example, 3D renderings can be applied or used in the context of imaging and video indexing, such as to detect actions in videos, which may be used for video indexing. As another example, 3D renderings can be used to allow virtual trying on of clothing. As another example, locations and movement of humans can be identified and can be used by a vehicle as objects to avoid.

Figure 2:
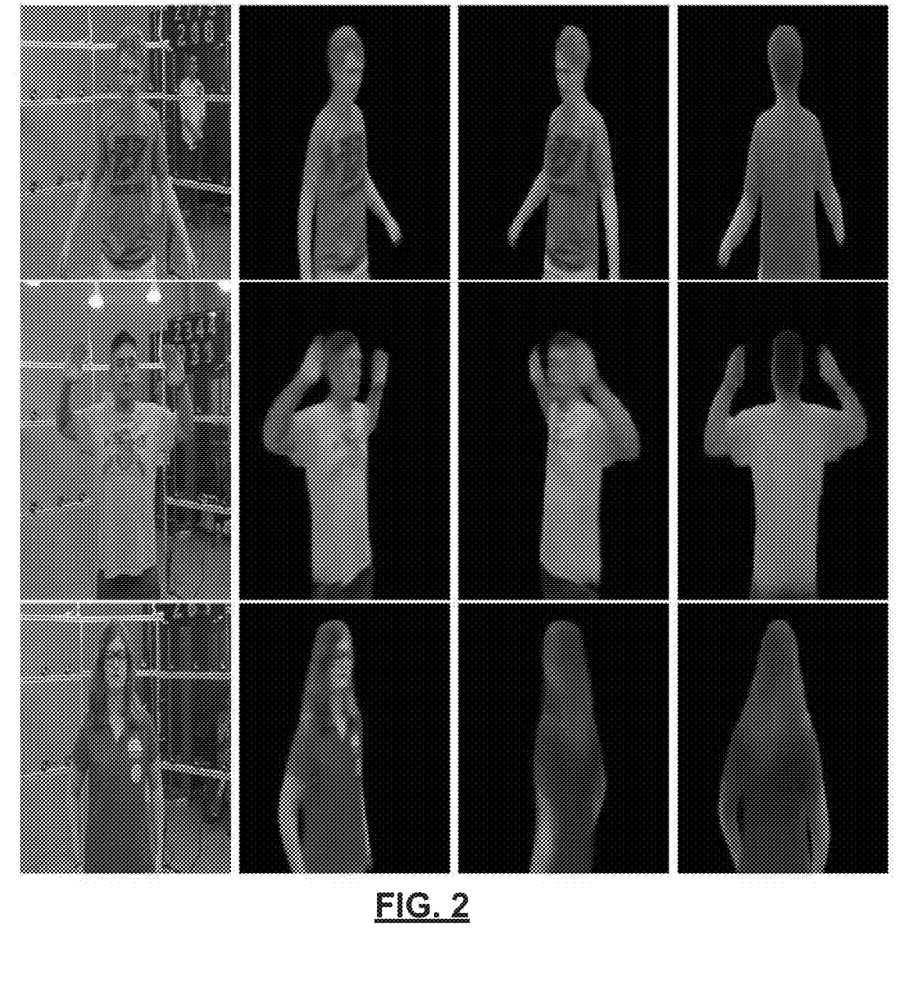
FIG. 2 includes monocular images on the left and example adjusted three dimensional (3D) renderings from different target POVs to the right generated based on the monocular images, respectively.

The left most column of FIG. 2 includes example monocular images. The images to the right of each monocular image include adjusted three dimensional (3D) renderings from different target POVs generated by the rendering module 116.

Figure 3:
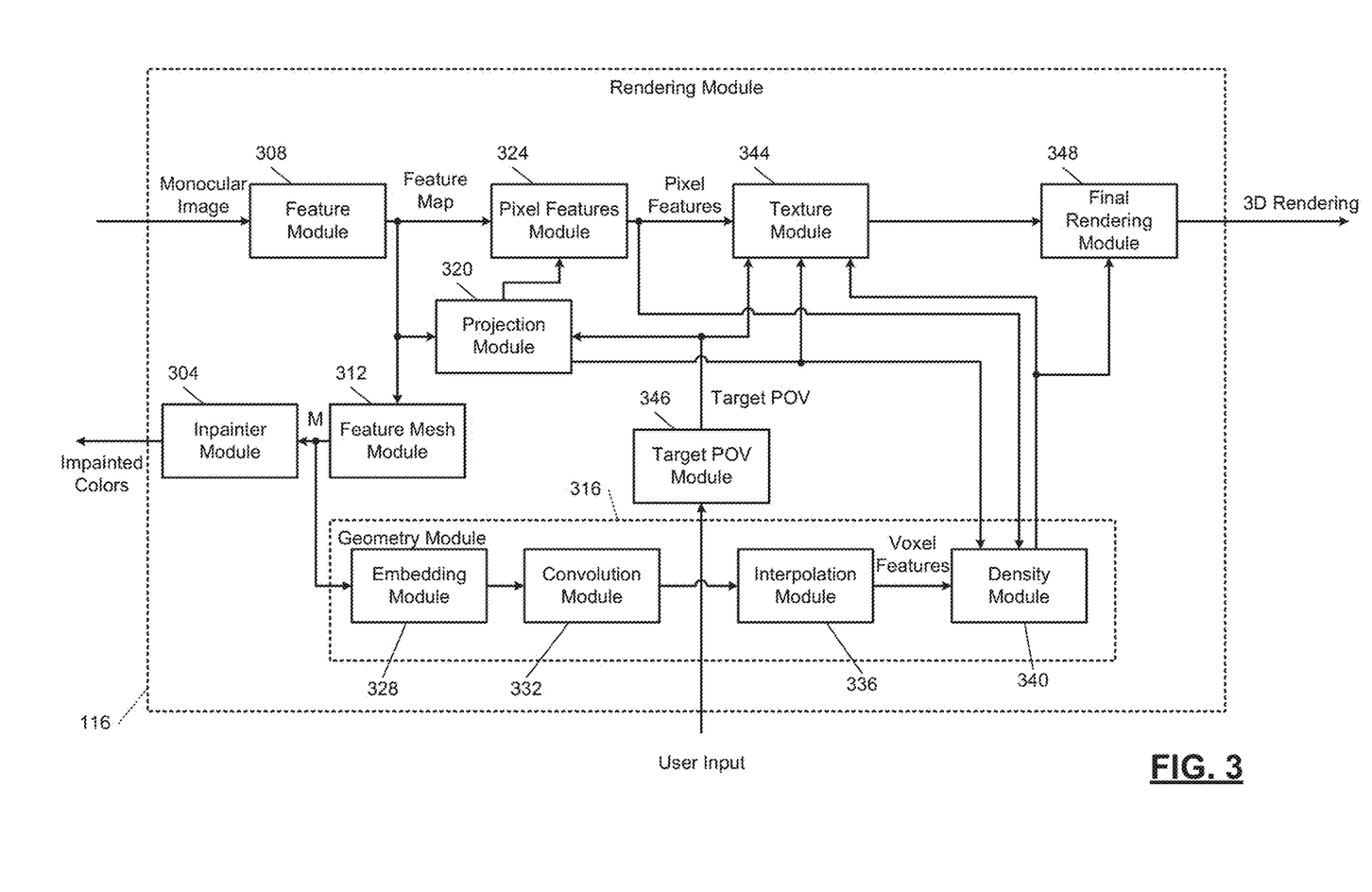
FIGS. 3 and 4 are functional block diagrams of an example implementation of a rendering module.
Figure 4:
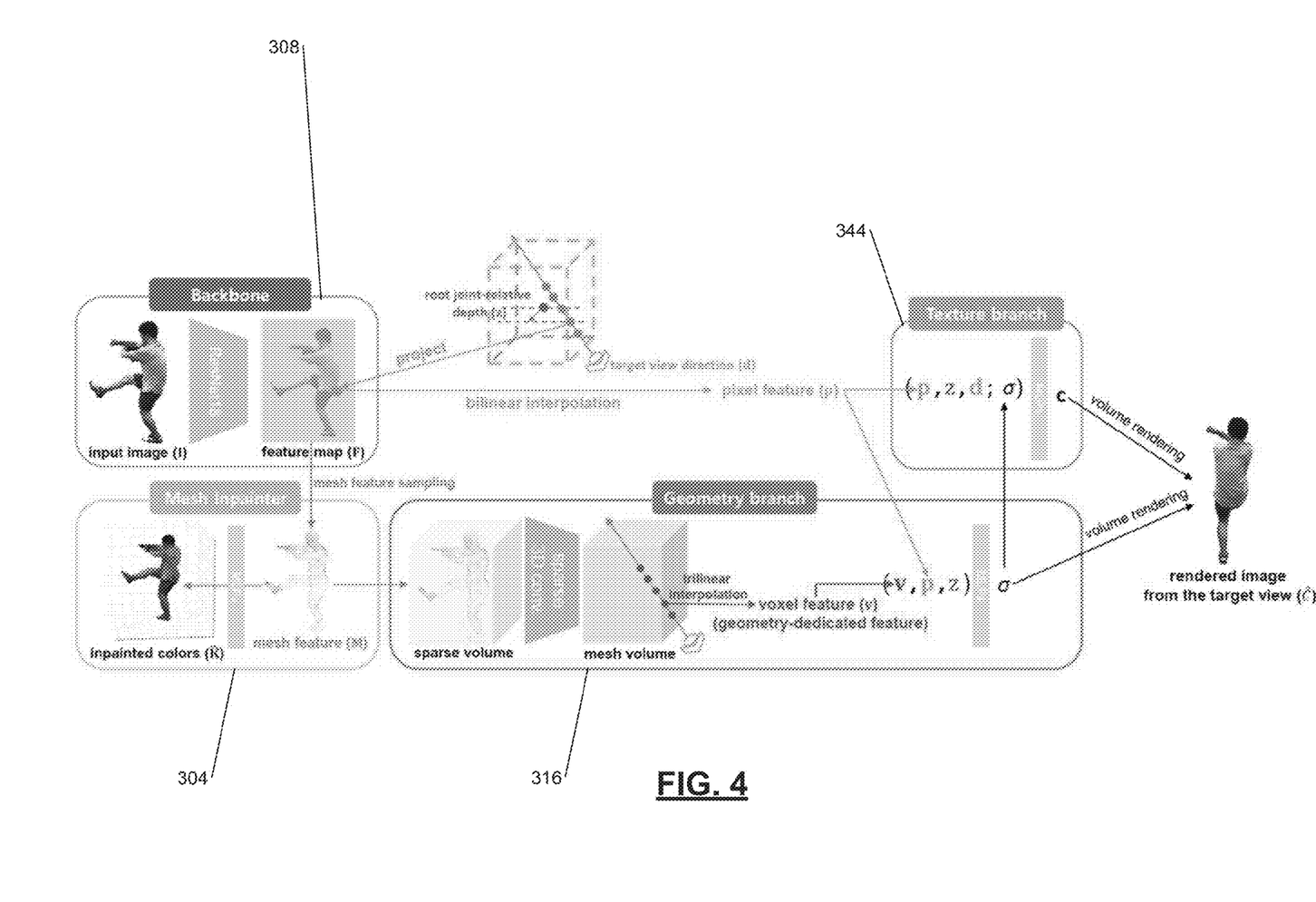

FIGS. 3 and 4 are functional block diagrams of an example implementation of the rendering module 116. The rendering module 116 (and an inpainter module 304) are trained in an end to end manner.

A feature module 308 may be referred to as a backbone and extracts image features from a monocular image including a human to be rendered in 3D. The feature module 308 is pretrained to generate the image features for the visible portions of the human in the monocular image and non-visible portions of the human in the image. The monocular image may be masked before being input to the feature module 308. In other words, the feature module 308 generates feature vectors based on the monocular image. The feature module 308 may include the ResNet-18 image recognition convolutional neural network or another suitable type of image recognition module. The feature module 308 allows for learning of human priors which ultimately enable estimation of human appearances unseen during training.

The feature module 308 receives a masked human image $I \in \mathbb{R}^{3 \times 256 \times 256}$ and generates a feature map $F \in \mathbb{R}^{c_p \times 128 \times 128}$. $c_p$ is the features channel dimension and may be equal to 64. Masking of the monocular image may be performed by a suitable masking module.

The feature map F is used in two ways (a) to generate vertex features and (b) to generate pixel features. A feature mesh module 312 generates the mesh vertices based on the feature map. The feature mesh module 312 may generate the mesh vertices further based on pre-estimated meshes, such as pre-estimated SMPL meshes. The feature mesh module 312 samples (e.g., per vertex) image features from the feature map F, such as given the mesh's vertices, such as described in Matthew Loper, et al., SMPL: a Skinned Multi Person Linear Model, ACN TOG, 2015, which is incorporated herein in its entirety. The feature mesh module 312 may project the 3D vertices onto the image plane and use interpolation (e.g., bilinear interpolation) to sample the corresponding image features. The feature mesh module 312 may concatenate the per-vertex image features and the vertices' root joint (i.e., pelvis)-relative depths to distinguish the features of both occluded and occluding parts. The concatenated feature may be referred to as a mesh feature and denoted as $M \in \mathbb{R}^{M \times (c_p+1)}$, where M denotes the number of mesh vertices. The mesh feature is input to a geometry module 316.

Regarding generating the pixel features, a projection module 320 samples 3D query points from a ray of a target POV (for the human to be rendered in), such as following the quadrature rule of the volume rendering discussed in Nelson Max, Optical Models for Direct Volume Rendering, TVCG, 1995, which incorporated herein in its entirety. The rays may be bounded by the given mesh's 3D bounding box, such as described in Sida Peng, et al., Neural Body: Implicit Neural Representations with Structured Latent Codes for Novel View Synthesis of Dynamic Humans, in CVPR, 2021, and Youngjoon Kwon, et al., Neural Human Performer: Learning Generalizable Radiance Fields for Human Performance Rendering, In ICCV, 2021, which are incorporated herein in their entirety. The 3D query point $x \in \mathbb{R}^3$ includes appearance information from its projection on the image plane. This information may be referred to as a pixel feature $p \in \mathbb{R}^{c_p}$ and is generated by a pixel features module 324 using interpolation (e.g., bilinear interpolation) based on the query points from the projection module 320 and the feature map.

The inpainter module 304 generates (reconstructs) the mesh vertices' colors of the monocular image. The inpainter module 304 may include a multilayer perceptron (MLP) module or another suitable type of inpainter module. The inpainter module 304 receives the mesh feature M and regresses the vertices' colors $\hat{K} \in \mathbb{R}^{M \times 3}$. The vertices' colors $\hat{K}$ are used during training. The inpainter module 304 determines the vertices' ground truth (GT) colors by first projecting the vertices to multi-view images based on considering visibility. Then the inpainter module 304 samples the vertices' colors from each image, such as using interpolation (e.g., bilinear interpolation). Then the inpainter module 304 averages the visible vertices' sampled colors to generate the vertices' colors $\hat{K}$.

The geometry module 316 also receives the mesh feature M. The geometry module 316 may include an embedding module 328, a convolution module 332, an interpolation module 336, and a density module 340.

The geometry module 316 regresses a density value a of a 3D query point x. In this regard, sparse 3D convolutions may be used, such as in Sida Peng, et al., Neural Body: Implicit Neural Representations with Structured Latent Codes for Novel View Synthesis of Dynamic Humans, in CVPR, 2021, and Youngjoon Kwon, et al., Neural Human Performer: Learning Generalizable Radiance Fields for Human Performance Rendering, In ICCV, 2021, which are incorporated herein in their entirety. The sparse features of the mesh feature M lie within a sparse 3D volume (e.g., generated by the embedding module 328). The embedding module 328 may embed the mesh feature into a 3D grid within the sparse 3D volume.

The convolution module 332 receives the sparse 3D volume and extracts multi scale feature volumes, which may be denoted as mesh volumes. The convolution module 332 may include a sparse 3D convolutional neural network or another suitable type of neural network.

From each mesh volume, the interpolation module 332 samples the feature corresponding to the query point x based on its 3D camera coordinates using interpolation (e.g., trilinear interpolation) to generate voxel feature $v \in \mathbb{R}^{c_v}$. $c_v$ is the feature's channel dimension and may be 192 or another suitable value. The voxel feature v is used for geometry estimation of the human in the monocular image and may be considered a geometry dedicated feature.

The density module 340 determines the density a of the query point x based on the voxel feature v, the pixel feature p for the query point, and the root joint relative depth z. The density module 340 may determine the density using one or more lookup tables and/or equations. For example, the density module 340 may include a MLP network module and determine the density using the equation:

$$\sigma(x) = M_\sigma(v, p, z),$$

where $M_\sigma$ is a MLP network having N layers, where N is an integer greater than 1 (e.g., 4). N=4 may provide suitable results. The density module 340 determines the density for each query point. The density a for a query point may be the output from the next to last layer of the MLP module.

A texture module 344 regresses a red green blue (RGB) value c for a query point x. The RGB color of x is estimated by the texture module 344 based on the pixel feature p, the root joint-relative depth z, and the target POV (target view's ray direction $d \in \mathbb{R}^3$) and the density a for the query point x. The texture module 344 may determine the RGB color using one or more equations and/or lookup tables that relate pixel features, root joint relative depths, target POVs, and densities to RGB colors. The texture module 344 may determine the RGB color for each query point. For example, the texture module 344 may determine the RGB color of a query point using the equation:

$$c(x) = M_c(p, z, Rd; \sigma)$$

where $M_c$ is a neural network (e.g., a MLP network with N layers, where N is an integer greater than 1, such as 5), and R denotes the world-to-camera rotation matrix. R transforms the view direction to the input image's camera coordinate system. The density a provides information on the occupancy of a given 3D query point. The occupancy information is useful as RGB values exist on the occupied points. While the example of use of the density to determine the RGB color is described, the voxel feature of the query point x may be used in place of the density of the query point.

A target module 346 determines the target POV based on the user input, as discussed above. A final rendering module 348 performs volume rendering and produces the 3D rendering of the human at the target POV based on the RGB color and the density of each query point x using a volume rendering algorithm. Given a target POV, the final rendering module 348 may generate the 3D rendering using a differentiable raymarching algorithm following the NeRF algorithm described in Ben Mildenhall, et al., Nerf: Representing Scenes as Neural Radiance Fields for View Synthesis, in ECCV, 2020. An example differentiable raymarching algorithm is described in James T Kajiya, et al., Ray Tracing Volume Densities, In SIGGRAPH, 1984. Another suitable volume rendering algorithm may be used.

The final rendering module 348 may determine the final color of a pixel based on or as an integral of RGB values along the ray from the camera center $o \in \mathbb{R}^3$ weighted by the volume densities. The integral may be approximated by the final rendering module 348 via stratified sampling, and the rendering module 348 may use the quadrature rule to limit memory usage and predict continuous radiance fields. An example of stratified sampling is discussed in Ben Mildenhall, et al., NeRF: Representing Scenes as neural Radiance Fields for View Synthesis, ECCV, 2020.

For each pixel, the final rendering module 348 samples along the ray N query points $$\{x_i\}_{i=1}^N,$$

where $x_i=(o+z_i \cdot d)$ and $z_i \in [z_{near}, z_{far}]$. $z_{near}$ and $z_{far}$ are absolute depths of the two intersections between the ray and the mesh's 3D bounding box. The pixel color of the ray is computed by the final rendering module 348 using one or more equations and/or lookup tables, such as using the equations:

$$\hat{C}(r) = \Sigma_{i=1}^N T_i(1-\exp(-\sigma(x_i)\delta_i))c(x_i) \text{ and}$$

$$T_i = \exp(-\Sigma_{j=1}^{i-1} \sigma(x_j)\delta_j),$$

where $\delta_i = \|x_{i+1}-x_i\|_2$ is the distance between adjacent sampled points, and r is the camera ray. In various implementations, N may be equal to 64 (for improving results) or another suitable value.

Figure 5:
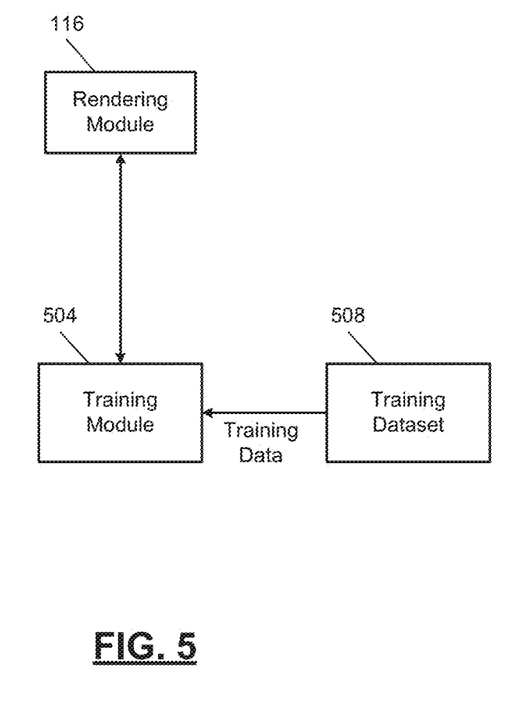
FIG. 5 is a functional block diagram of an example training system.

FIG. 5 is a functional block diagram of an example training system. A training module 504 trains the rendering module 116 using training data of a training dataset 508 stored in memory. The training module 504 trains the rendering module 116 using two loss functions (a) an inpainting loss and (b) a rendering loss. Training may include adjusting one or more parameters (e.g., one or more weight values) of one or more components of a module. The training dataset may include monocular images to be rendered and associated known data to be compared with outputs generated by the rendering module 116.

The training module 504 may train the rendering module 116 (e.g., the feature mesh module 312) based on minimizing the inpainting loss determined based on a difference between colors of vertices determined by the inpainter module 304 as described above and ground truth colors of the vertices. The ground truth (GT) colors may be determined as described above from a training image or stored in the training dataset 508. The inpainting loss may be described by the equation:

$$L_{inpaint} = \Sigma \|\hat{K}-K\|_2^2,$$

where $\hat{K}$ and K are the determined and ground truth colors of the vertices, respectively.

The training module 504 may train the rendering module 116 (e.g., at least one of the final rendering module 348 and the texture module 344) based on minimizing the rendering loss determined based on a difference between pixel colors (e.g., of the generated 3D rendering or the RGB colors) and ground truth pixel colors of the pixels. The ground truth (GT) pixel colors may be determined as described above from a training image or stored in the training dataset 508. The rendering loss may be described by the equation:

$$L_{render} = \Sigma_{r \in \mathcal{R}} \|\hat{C}(r)-C(r)\|_2^2,$$

where $\mathcal{R}$ is a set of 3D query points on camera rays passing through image pixels, $\hat{C}(r)$ is the pixel colors determined by the final rendering module 348, and C(r) is the ground truth pixel colors. The training dataset 508 may be any suitable training dataset, such as the ZJU-MoCap dataset, the AIST dataset, the CAPE dataset, or the HUfMBI dataset.

Training as described above allows the rendering module 116 to more accurately generate 3D renderings of humans from monocular images from different target POVs than other manners of 3D rendering, such as in terms of color, clarity, accuracy, etc.

Figure 6:
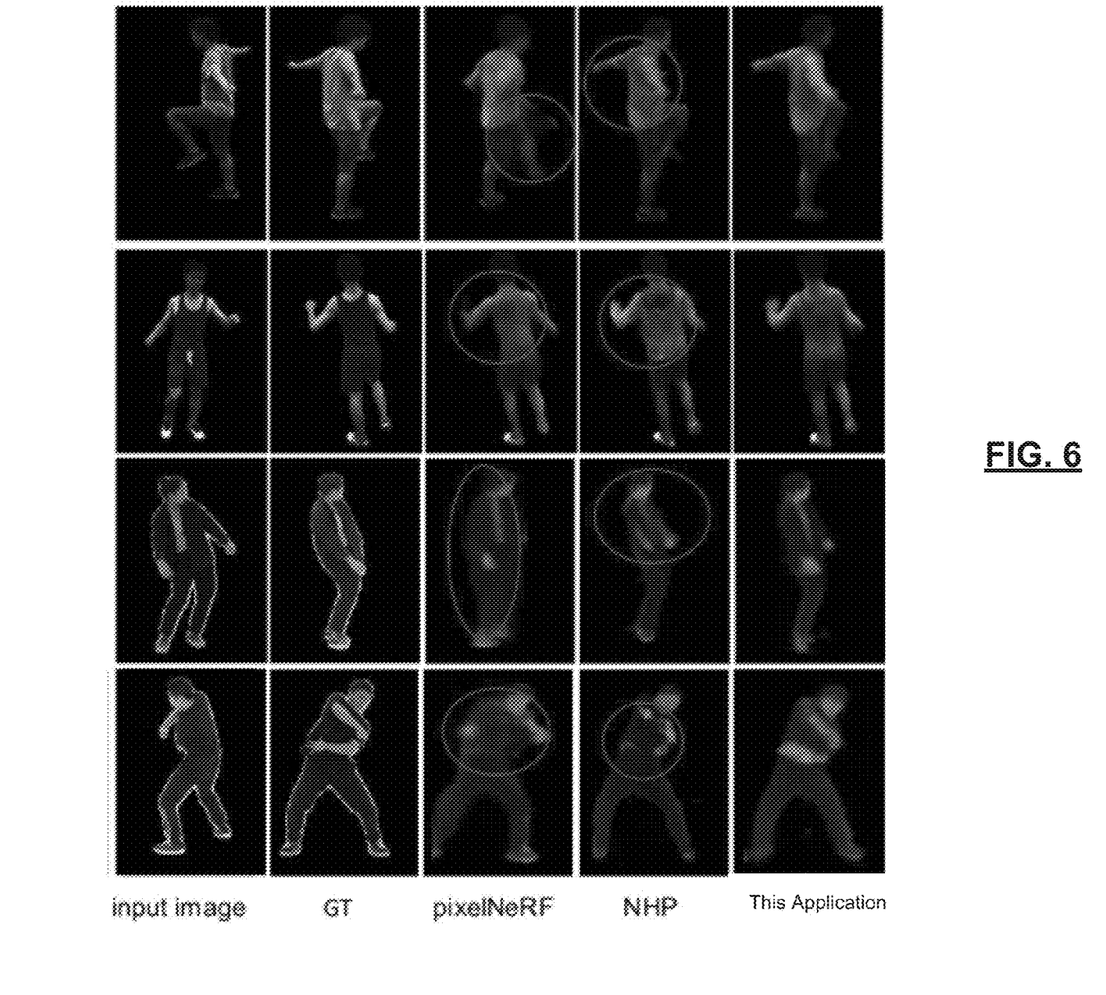
FIG. 6 illustrates example training images (left most column), ground truth training images from a different target POV (second to left column). 3D renderings generated for the same target POV in other manners including using pixelNeRF (middle column) and NHP (second to right column), and 3D renderings for the same target POV generated by the rendering module architected and trained as described herein (right most column)

FIG. 6 illustrates example training images (left most column) and ground truth training images from a different target POV (second to left column). FIG. 6 also includes 3D renderings generated for the same target POV in other manners including using pixelNeRF (middle column) and NHP (second to right column). FIG. 6 also includes 3D renderings for the same target POV generated by the rendering module 116 architected and trained as described herein (right most column). As illustrated by comparing the right most column to the second to left column, the middle column, and the second to right column, the present application provides more accurate 3D renderings that are closer to the ground truth images.

Disentanglement of the geometry and texture features are benefited by the voxel features v being input to both the density and texture modules 340 and 344. The disentanglement improves 3D renderings both qualitatively and quantitatively. Noise on the invisible surfaces texture is removed, and overall visual quality is enhanced.

Use of the inpainter module 304 also improves 3D renderings both qualitatively and quantitatively by better inferring geometry and texture of areas of the human not included in the monocular image. To this end, the feature module 308 accurately generates accurate features for unseen portions of humans in monocular images based on prior training, such as symmetry of human parts and color similarity between surfaces of the same part. Conditioning on geometry when estimating texture is performed by the final rendering module 348. Geometry provides information on whether a 3D query point is occupied or not and helps to produce accurate textures.

Figure 7:
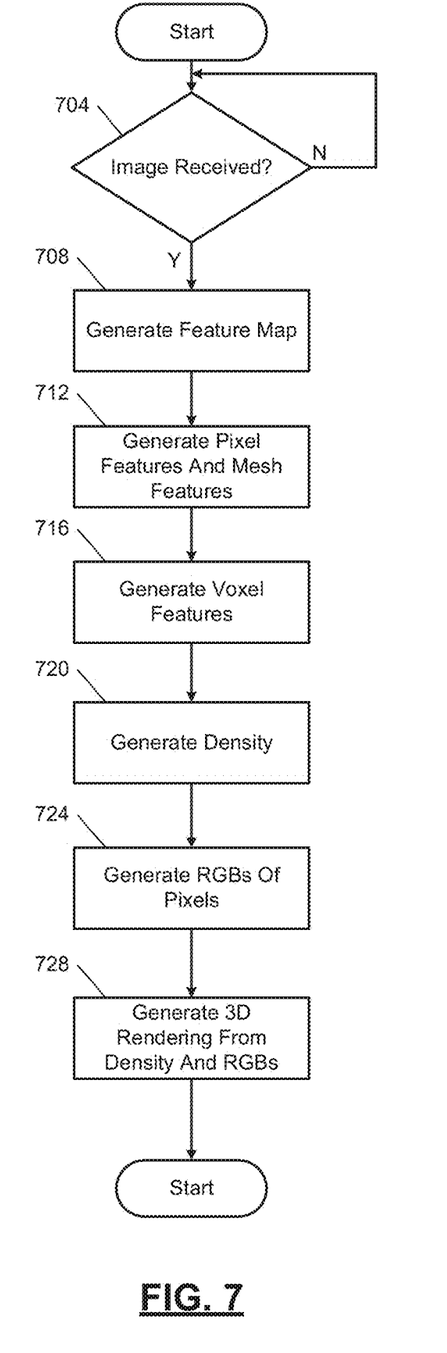
FIG. 7 is a flowchart depicting an example method of generating a 3D rendering of a human using a single monocular image unseen during training.

FIG. 7 is a flowchart depicting an example method of generating a 3D rendering of a human using a single monocular image unseen during training. Control begins with 704 where the feature module 308 determines whether an image (a monocular image) including a human has been received. If 704 is true, control continues with 708. If 704 is false, control remains at 704.

At 708, the feature module 308 generates a feature map based on the image. The feature module 308 is pretrained such that the feature map includes features of the human body that are non-visible in the image. In various implementations, the feature module 308 may be pretrained on other than human bodies, such as the body of another animal or a robot.

At 712, the pixel features module 324 generates the pixel features based on the feature map, as described above. The feature mesh module 312 also generates the mesh features as described above. The pixel features are provided to the geometry module 316 for use in determining the density. At 716, the geometry module 316 generates the voxel feature, as described above, based on the mesh features and processing the mesh features using a sparce 3D CNN before extracting the voxel feature.

At 720, the geometry module 316 determines the density based on the voxel feature, the pixel features, and root joint relative depth z. The density is provided to the texture module 344 for the determination of the RGB colors (or grayscale values) of the pixels. At 725, the texture module 344 determines the RGB colors (or grayscale values) of the pixels based on the pixel features, the root joint relative depth, the target POV (or target view ray direction d), and the density. At 728, the final rendering module 348 generates the 3D rendering of the human in the received image from the target POV based on the RGB colors (or grayscale values) of the pixels and the density (value) using a volume rendering application.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A human rendering system, comprising:
    a feature module configured to generate a feature map based on a single image taken from a point of view (POV) including a human based on features of the human visible in the image and non-visible features of the human;
    a pixel features module configured to generate pixel features based on the feature map and a target POV that is different than the POV of the image;
    a feature mesh module configured to generate a feature mesh for the human based on the feature map;
    a geometry module configured to:
        generate voxel features based on the feature mesh for the human; and
        generate a density value based on the voxel features and the pixel features;
    a texture module configured to generate red green blue (RGB) colors for pixels based on the density value and the pixel features; and
    a rendering module configured to generate a three dimensional (3D) rendering of the human in the image from the target POV based on the RGB colors and the density value.

2. The human rendering system of claim 1 wherein the rendering module is configured to generate the 3D rendering of the human using a volume rendering algorithm.

3. The human rendering system of claim 1 wherein the feature module includes the ResNet-18 convolutional neural network.

4. The human rendering system of claim 1 wherein the texture module is configured to generate the RGB colors for the pixels further based on a distance to a root joint of the human.

5. The human rendering system of claim 4 wherein the root joint is a pelvis of the human.

6. The human rendering system of claim 4 wherein the texture module is configured to generate the RGB colors for the pixels further based on the target POV.

7. The human rendering system of claim 1 wherein the geometry module is configured to generate the density value further based on a distance to a root joint of the human.

8. The human rendering system of claim 1 wherein the texture module is configured to generate the RGB colors for the pixels using a multilayer perceptron (MLP) network.

9. The human rendering system of claim 1 wherein the geometry module is configured to generate the density value using a multilayer perceptron (MLP) network.

10. The human rendering system of claim 9 wherein the MLP network includes N layers where N is an integer greater than 2 and is configured to output the density value from a second to last one of the N layers of the MLP network.

11. The human rendering system of claim 1 further comprising an inpainter module configured to determine colors for vertices, respectively, of the feature mesh.

12. The human rendering system of claim 11 wherein the inpainter module determine the colors for the vertices, respectively, and generates the density value using a multilayer perceptron (MLP) network.

13. The human rendering system of claim 11 further comprising a training module configured to selectively adjust one or more parameters of the feature mesh module based on minimizing differences between (a) the colors for the vertices of the feature mesh and (b) ground truth colors for the vertices of the feature mesh.

14. The human rendering system of claim 1 further comprising a training module configured to selectively adjust one or more parameters of the texture module based on minimizing differences between (a) the RGB colors for the pixels and (b) ground truth RGB colors for the pixels.

15. The human rendering system of claim 1 wherein the rendering module is configured to generate the 3D rendering of the human in the image from the target POV based on the RGB colors and the density value without the human rendering system receiving any other images including the human.

16. The human rendering system of claim 15 further comprising a training module configured to train the rendering module using two loss functions (a) an inpainting loss and (b) a rendering loss.

17. The human rendering system of claim 1 wherein the feature mesh module is configured to generate the feature mesh for the human further based on a pre-estimated mesh.

18. A body rendering system, comprising:
    a feature module configured to generate a feature map based on a single image taken from a point of view (POV) including a body based on features of the body visible in the image and non-visible features of the body in the image;
    a pixel features module configured to generate pixel features based on the feature map and a target POV that is different than the POV of the image;

a feature mesh module configured to generate a feature mesh for the body based on the feature map;
a geometry module configured to:
generate voxel features based on the feature mesh for the body; and
generate a density value based on the voxel features and the pixel features;
a texture module configured to generate pixel values for pixels based on the density value and the pixel features; and
a rendering module configured to generate a three dimensional (3D) rendering of the body in the image from the target POV based on the pixel values and the density value.

19. The body rendering system of claim 18 wherein the body visible in the image is a human body.

20. The body rendering system of claim 18 wherein the pixel values correspond to one of RGB color values and grayscale values.

21. A human rendering method, comprising:
generating a feature map based on a single image taken from a point of view (POV) including a human based on features of the human visible in the image and non-visible features of the human;
generating pixel features based on the feature map and a target POV that is different than the POV of the image;
generating a feature mesh for the human based on the feature map;
generating voxel features based on the feature mesh for the human;
generating a density value based on the voxel features and the pixel features;
generating red green blue (RGB) colors for pixels based on the density value and the pixel features; and
generating a three dimensional (3D) rendering of the human in the image from the target POV based on the RGB colors and the density value.

22. The human rendering method of claim 21 wherein generating the 3D rendering includes generating the 3D rendering of the human using a volume rendering algorithm.

23. The human rendering method of claim 21 wherein generating the feature map includes generating the feature map using the ResNet-18 convolutional neural network.

24. The human rendering method of claim 21 wherein generating the RGB colors includes generating the RGB colors for the pixels further based on a distance to a root joint of the human.

25. The human rendering method of claim 24 wherein the root joint is a pelvis of the human.

26. The human rendering method of claim 24 wherein generating the RGB colors includes generating the RGB colors for the pixels further based on the target POV.

27. The human rendering method of claim 21 wherein generating the density value includes generating the density value further based on a distance to a root joint of the human.

28. The human rendering method of claim 21 wherein generating the RGB colors includes generating the RGB colors for the pixels using a multilayer perceptron (MLP) network.

29. The human rendering method of claim 21 wherein generating the density value includes generating the density value using a multilayer perceptron (MLP) network.

30. The human rendering method of claim 29 wherein the MLP network includes N layers where N is an integer greater than 2 and is configured to output the density value from a second to last one of the N layers of the MLP network.

31. The human rendering method of claim 21 further comprising determining colors for vertices, respectively, of the feature mesh.

32. The human rendering method of claim 31 wherein determining the colors includes determining the colors for the vertices, respectively, and the human rendering method further includes generating the density value using a multilayer perceptron (MLP) network.

33. The human rendering method of claim 31 further comprising selectively adjusting one or more parameters based on minimizing differences between (a) the colors for the vertices of the feature mesh and (b) ground truth colors for the vertices of the feature mesh.

34. The human rendering method of claim 21 further comprising selectively adjusting one or more parameters based on minimizing differences between (a) the RGB colors for the pixels and (b) ground truth RGB colors for the pixels.

35. The human rendering method of claim 21 wherein generating the 3D rendering includes generating the 3D rendering of the human in the image from the target POV based on the RGB colors and the density value independently of any other images including the human.

36. The human rendering method of claim 35 further comprising training for the 3D rendering of the human using two loss functions (a) an inpainting loss and (b) a rendering loss.

37. The human rendering method of claim 21 wherein generating the feature mesh includes generating the feature mesh for the human further based on a pre-estimated mesh.

38. A body rendering method, comprising:
generating a feature map based on a single image taken from a point of view (POV) including a body based on features of the body visible in the image and non-visible features of the body in the image;
generating pixel features based on the feature map and a target POV that is different than the POV of the image;
generating a feature mesh for the body based on the feature map;
generating voxel features based on the feature mesh for the body;
generating a density value based on the voxel features and the pixel features;
generating pixel values for pixels based on the density value and the pixel features; and
generating a three dimensional (3D) rendering of the body in the image from the target POV based on the pixel values and the density value.

39. The body rendering method of claim 38 wherein the body visible in the image is a human body.

40. The body rendering method of claim 38 wherein the pixel values correspond to one of RGB color values and grayscale values.

* * * * *